United States Patent
Cleveland et al.

(10) Patent No.: US 12,102,260 B2
(45) Date of Patent: Oct. 1, 2024

(54) ROTISSERIE CLAMP

(71) Applicant: Linwood Resources, LLC, St. Paul, MN (US)

(72) Inventors: David R. Cleveland, Big Sky, MT (US); David O. Sewall, St. Paul, MN (US)

(73) Assignee: Linwood Resources, LLC, St. Paul, MN (US)

( * ) Notice: Subject to any disclaimer, the term of this patent is extended or adjusted under 35 U.S.C. 154(b) by 0 days.

(21) Appl. No.: 18/376,366

(22) Filed: Oct. 3, 2023

(65) Prior Publication Data

US 2024/0023752 A1    Jan. 25, 2024

Related U.S. Application Data

(63) Continuation of application No. PCT/US2022/023366, filed on Apr. 4, 2022.

(60) Provisional application No. 63/170,957, filed on Apr. 5, 2021.

(51) Int. Cl.
*A47J 37/04* (2006.01)
*A47J 37/07* (2006.01)

(52) U.S. Cl.
CPC ........... *A47J 37/041* (2013.01); *A47J 37/047* (2013.01); *A47J 37/0745* (2013.01)

(58) Field of Classification Search
CPC ........ A47J 37/041; A47J 37/04; A47J 37/043; A47J 37/046; A47J 37/047; A47J 37/0745
USPC ........................................ 99/421 H, 421 HH
See application file for complete search history.

(56) References Cited

U.S. PATENT DOCUMENTS

| | | | |
|---|---|---|---|
| 3,276,440 A | 10/1966 | Sazegar | |
| 3,809,058 A | 5/1974 | Becker | |
| 4,688,477 A | 8/1987 | Waltman | |
| 5,772,048 A * | 6/1998 | Sopcisak | B62H 3/00 211/20 |
| 5,775,352 A | 7/1998 | Obitts | |
| 6,220,152 B1 | 4/2001 | Balswin et al. | |
| 6,546,845 B1 * | 4/2003 | Lanzilli | A47J 37/041 99/449 |
| 9,341,308 B2 | 5/2016 | Lacy | |

(Continued)

FOREIGN PATENT DOCUMENTS

| | | |
|---|---|---|
| AU | 2010203029 B2 | 8/2010 |
| DE | 20 2007 012 749 U1 | 12/2007 |

(Continued)

OTHER PUBLICATIONS

International Search Report and Written Opinion of the ISA for PCT/US22/23366, mailed Jun. 30, 2022, 10 pages.

*Primary Examiner* — Reginald Alexander
(74) *Attorney, Agent, or Firm* — Husch Blackwell LLP

(57) ABSTRACT

Rotisserie forks and a basket for use on a motorized elongated spit rod having a central axis and a sharpened tip, wherein the forks or basket have a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling.

22 Claims, 4 Drawing Sheets

(56) References Cited

U.S. PATENT DOCUMENTS

| | | | |
|---|---|---|---|
| D992,352 S | 7/2023 | Hyde et al. | |
| 2005/0273984 A1* | 12/2005 | Anderson | B62H 5/00 |
| | | | 24/279 |
| 2007/0079709 A1 | 4/2007 | Giblin et al. | |
| 2009/0095167 A1* | 4/2009 | Groves | A47J 37/041 |
| | | | 99/421 H |
| 2009/0308373 A1 | 12/2009 | Scott et al. | |
| 2010/0095946 A1 | 4/2010 | Creel | |
| 2010/0025869 A1 | 10/2010 | Kleitsch et al. | |
| 2010/0258105 A1 | 10/2010 | Simms, II | |
| 2010/0258106 A1 | 10/2010 | Simms, II | |
| 2014/0021314 A1 | 1/2014 | Bourlier | |
| 2015/0216215 A1* | 8/2015 | Cristovao | A47J 37/0786 |
| | | | 426/302 |
| 2017/0119209 A1 | 5/2017 | Jenks | |
| 2017/0196398 A1* | 7/2017 | Cleveland | A47J 37/042 |
| 2019/0082883 A1* | 3/2019 | Jones | A47J 37/041 |

FOREIGN PATENT DOCUMENTS

| | | |
|---|---|---|
| FR | 2 246 248 A1 | 5/1975 |
| FR | 2 795 614 A1 | 1/2001 |

\* cited by examiner

ROTISSERIE CLAMP

CROSS REFERENCE TO RELATED APPLICATION

This application is a continuation under 35 U.S.C. § 111(a) of International Patent Application No. PCT/US2022/023366, filed Apr. 4, 2022 and entitled "Rotisserie Clamp", which claims the benefit of U.S. Provisional Application No. 63/170,957, filed Apr. 5, 2021 and entitled "Rotisserie Clamp," the disclosures of which are hereby incorporated by reference in their entirety.

FIELD

This invention relates to rotisserie devices.

BACKGROUND

Many outdoor cooks prefer to grill juicy or fatty foods using a rotisserie. The slowly-turning spit employed in such devices promotes a self-basting action that may provide more even cooking, may retain liquids in the food that might otherwise drip away, may reduce flare-ups and may provide more moist cooked foods.

Hinged, covered ceramic (viz., kamado) charcoal-burning grills have been used for many centuries. Until recently, most such grills were not sold with rotisserie capabilities. However, a wedge-shaped rotisserie adapter sold as the JoeTisserie™ adapter from Kamado Joe of Duluth, Georgia and shown in U.S. Pat. Nos. 9,603,484 B2 and 10,925,435 B2 has now become widely used in hinged, covered ceramic grills. As supplied, the JoeTisserie adapter is designed for the Kamado Joe 18 inch Classic series and 24 inch Big Joe™ series grills, but also fits similarly sized circular kamado grills from Big Green Egg and other suppliers of hinged, covered ceramic grills.

FIG. 1 shows wedge-shaped rotisserie adapter 100 including tapered ring 101 and a motor-driven rotisserie spit 102 including a polygonal (and in this case as well as by convention, square) cross-section spit rod 104 equipped with a pair of removable opposed forks 106. The position and thus the gap between forks 106 may be adjusted by sliding collars 108 along spit rod 104 and tightening thumbscrews 110 when a suitable gap is achieved. This gap normally corresponds to the length of a roast or other meat item that will be grilled using adapter 100. The polygonal cross-section of spit rod 104 helps discourage forks 106 and collars 108 from rotating with respect to spit rod 104 once thumbscrews 110 have been tightened. One end of spit 102 terminates at sharpened cylindrical end 112 which can revolve in recess 114. The other end of spit 102 passes through slot 116 in ring 101 and enters into a corresponding square recess (not shown in FIG. 1) in the output shaft of reduction gear motor 118. Motor 118 is secured with respect to ring 102 by mounting arm 120. When motor 118 is energized, it causes spit 102 to revolve and carry with it a food to be grilled (for example, meats, fish, vegetables, fruits or combination thereof) skewered on spit rod 104 between the forks 106. Although not shown in FIG. 1, the forks 106 may be replaced with a basket that can be used for grilling small, fragile or loose items such as chicken wings, fish (both whole and filets), fruits and vegetables.

The FIG. 1 rotisserie adapter is generally used outdoors. Although some cooks have outdoor food preparation areas located next to their grill, many cooks prepare food indoors. In either case, the cook typically washes, dries and seasons the food, followed by skewering the food on spit rod 104 between forks 106 and tightening thumbscrews 110. In order to ensure well-balanced, smoothly rotating rotisserie operation, the cook may have to loosen the thumbscrews 106, reposition the collars 108 to compress the forks 106 toward the center of the food, and retighten the thumbscrews 110. Several such adjustments may be required. Doing so can be difficult or time-consuming if skewer 102 is installed in adapter 100 above very hot coals. The cook may be burned while loosening and tightening the thumbscrews 110. To avoid being burned, the cook may instead have to remove skewer 102 from adapter 100 and relocate skewer 102 to a side table or even indoors in order to perform the adjustment. Similar problems may arise when using a basket rather than rotisserie forks.

Thumbscrews 110 in FIG. 1 are in effect manually-turned setscrews that lock collar 108 against spit rod 104. Rotisserie forks and baskets from other grill or grill accessory manufacturers generally employ similar setscrews or variants thereof, such as the looped setscrew 202 or the bent setscrew 204 shown in FIG. 3. Instead of a setscrew, the EVERDURE™ line of barbeque accessories from Heston Blumenthal employs an approximately 1.5 inch (38 mm) long lever 206 that can be moved in the direction of the spit rod central axis to fasten the rotisserie forks 208 or basket 210 to a spit rod. When lever 206 is closed, a raised rib (not shown in FIG. 2) on the underside of lever 206 presses against a spit rod (also not shown in FIG. 2) to discourage the fork or basket from moving on the spit rod.

SUMMARY

The above-described setscrew or lever clamping devices can be difficult to use, due for example to the significant manual turning torque or pressure that a cook may need to employ to secure the device on a spit rod. Cooks with long or painted fingernails may be reluctant to use such devices lest they damage a fingernail or its coating. Some cooks even resort to using pliers in order to obtain sufficient setscrew or lever tightness. In addition, when carrying out lengthy rotisserie grilling of large or unbalanced food loads (e.g., standing rib roasts, turkeys and other asymmetric or floppy foods), a setscrew may become loosened or a rotisserie fork may move back and forth from side to side and "walk" along a spit rod. Such loosening or movement can cause a rotisserie fork to lose its grip on the food, and in severe cases may cause the food to stop rotating or to brush against or even fall into a grill or onto the grill heat source (e.g., a charcoal, gas or wood pellet fire).

The present invention provides, in some embodiments, rotisserie forks or a basket for use on a motorized elongated spit rod having a central axis and a sharpened tip, wherein the forks or basket comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling. In some embodiments the shaft collar has a polygonal (e.g., square) opening with the same shape as a cross-section of the spit rod. In some embodiments the fork or basket is rotatably fixed with respect to the shaft collar whether the lever is open or closed. In some embodiments the lever-action quick-release clamp is free to rotate with respect to the shaft collar when the lever is open (thus permitting rotation of the lever with respect to the fork, basket or nearby food to a location that will enable more convenient lever opening and closing) and is rotatably fixed with respect to the shaft collar when the lever is closed. In some embodiments the fork is free to rotate with respect to the shaft collar when the lever is open (thus permitting rotation of the fork with respect to the spit rod when such rotation is desired in order to avoid bones or to skewer irregularly-shaped food) and is rotatably fixed with respect to the shaft collar when the lever is closed. In some embodiments the lever moves between its open and closed positions in a direction perpendicular to the spit rod central axis and thus does not unduly lengthen the forks or basket along the spit rod central axis. In some embodiments the quick-release lever has a length of at least 40 mm, at least 45 mm, at least 50 mm, at least 60 mm or at least 70 mm to facilitate opening and closing the lever. The disclosed forks and basket assists in positioning food and the forks or basket along the length of a spit rod and can reduce the need for as well as the time and manual effort required to adjust or otherwise alter such positioning, as well as reducing or eliminating loosening or other fork or basket movement with respect to the spit rod during rotisserie grilling.

The present invention provides, in additional embodiments, a rotisserie device for use in a ceramic or metal charcoal, gas or pellet grill, the device having at least one motor mounted outside the grill, a removable, rotatable elongated spit rod having a central axis and a sharpened tip and which is rotatably driven by the motor, and a plurality of forks or a basket removably mounted on the spit rod, wherein the forks or basket comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling. The device may have the embodiments already described above, as well as other embodiments. For example, in some embodiments the device includes two forks, and in some embodiments the device includes four or more forks. Also, in some embodiments the device includes a plurality of motors each driving a spit (e.g., two motors driving a total of two spits or three motors driving a total of three spits).

The present invention provides, in additional embodiments, a ceramic or metal charcoal, gas or pellet grill, the grill having at least one motor mounted outside the grill, a removable, rotatable elongated spit rod having a central axis and a sharpened tip and which is rotatably driven by the motor, and a plurality of forks or a basket removably mounted on the spit rod, wherein the forks or basket comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling.

The present invention provides, in additional embodiments, a method for outdoor grilling, comprising in either order the steps of a) building a fire from combustible material in a ceramic or metal charcoal, gas or pellet grill having a base and cover and at least one motor mounted or mountable outside the grill, and b) opening the cover and installing in the grill a removable, rotatable elongated spit rod having a central axis and a sharpened tip and which is rotatably driven by the motor, and a plurality of forks or a basket removably mounted on the spit rod, wherein the forks or basket comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling.

The disclosed rotisserie forks, baskets, devices, grills and methods provide improved rotisserie cooking. The disclosed forks, baskets or devices may be sold together with a new grill or as an aftermarket accessory for an existing grill.

BRIEF DESCRIPTION OF THE DRAWING

Like reference symbols in the various figures of the drawing indicate like elements. The elements in the drawing are not to scale.

DETAILED DESCRIPTION

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a rotisserie spit that includes "a" tined fork means that the spit includes "one or more" tined forks.

The term "aperture" means a hole, slot or other opening.

The term "essentially the same" when used with respect to a numerical measure or quantity means within ±10% and more preferably within ±5% of that measure or quantity.

The term "grill" means a cooking device capable of a variety of cooking tasks including but not limited to grilling, baking, smoking and roasting.

The term "span" when used in reference to the disclosed rotisserie device means the maximum axial length of meat that could be skewered on the spit and rotated without rubbing against a grill or a component part thereof.

Figure 1:
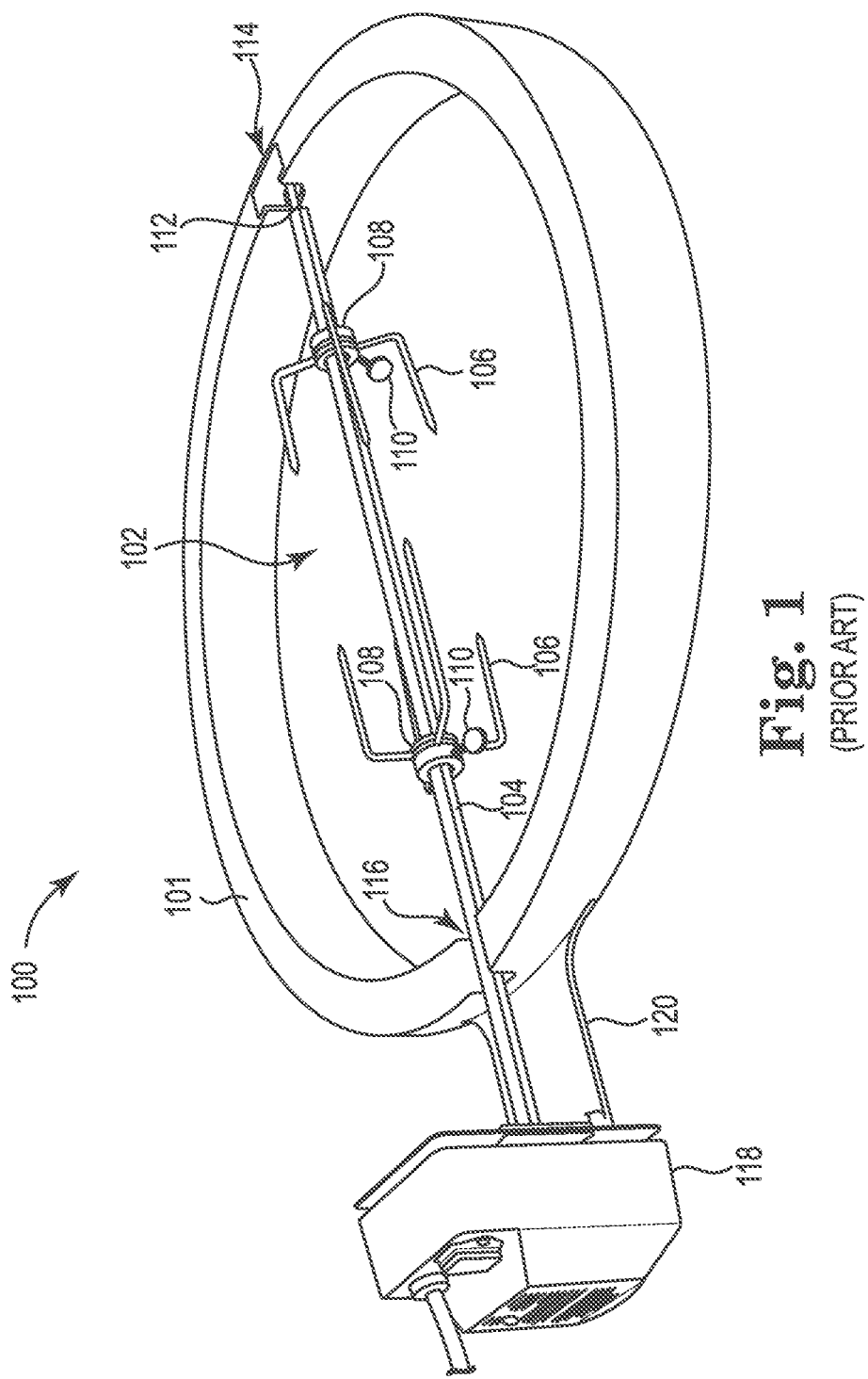
FIG. 1 is a perspective view of a wedge-shaped rotisserie adapter for use in hinged, covered grills.
Figure 2:
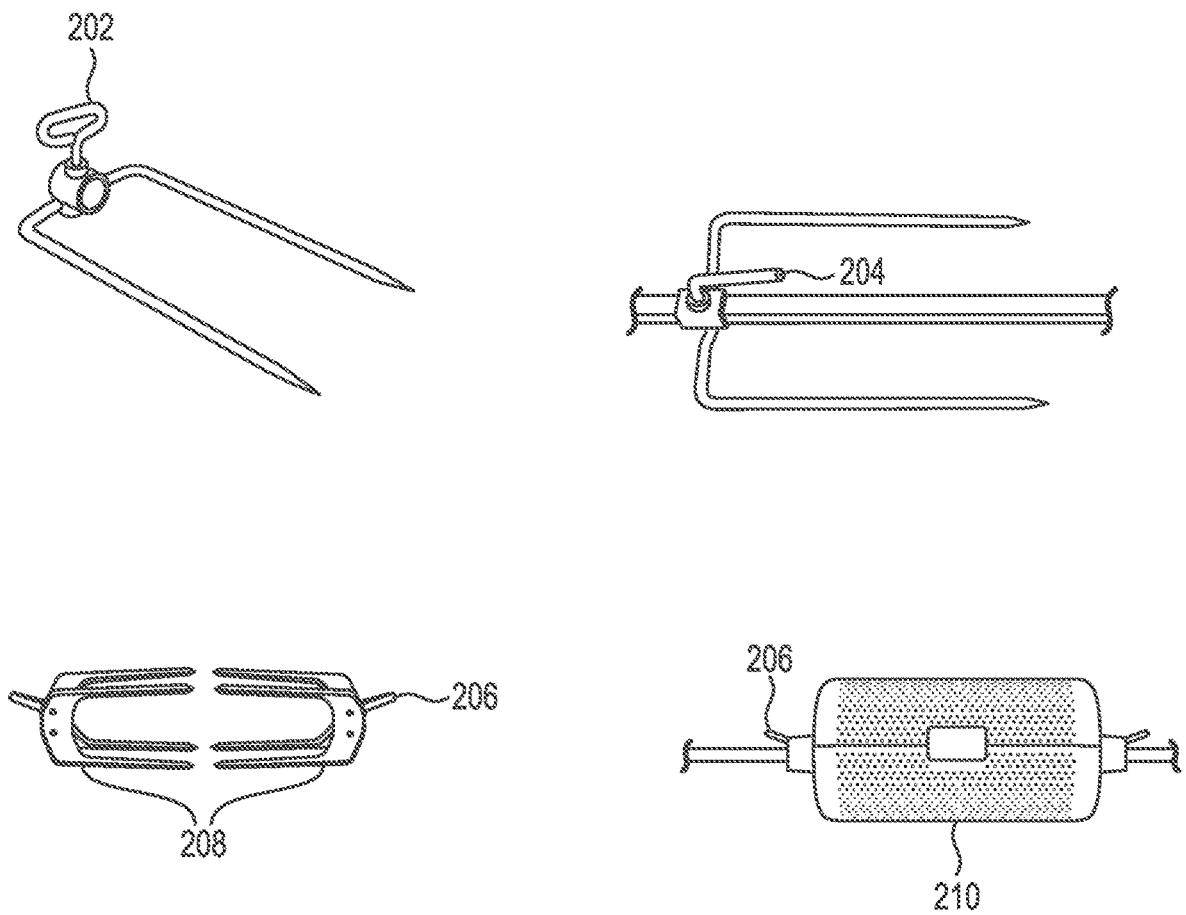
FIG. 2 is a perspective view of several rotisserie fork or basket clamping devices of the prior art.
Figure 3:
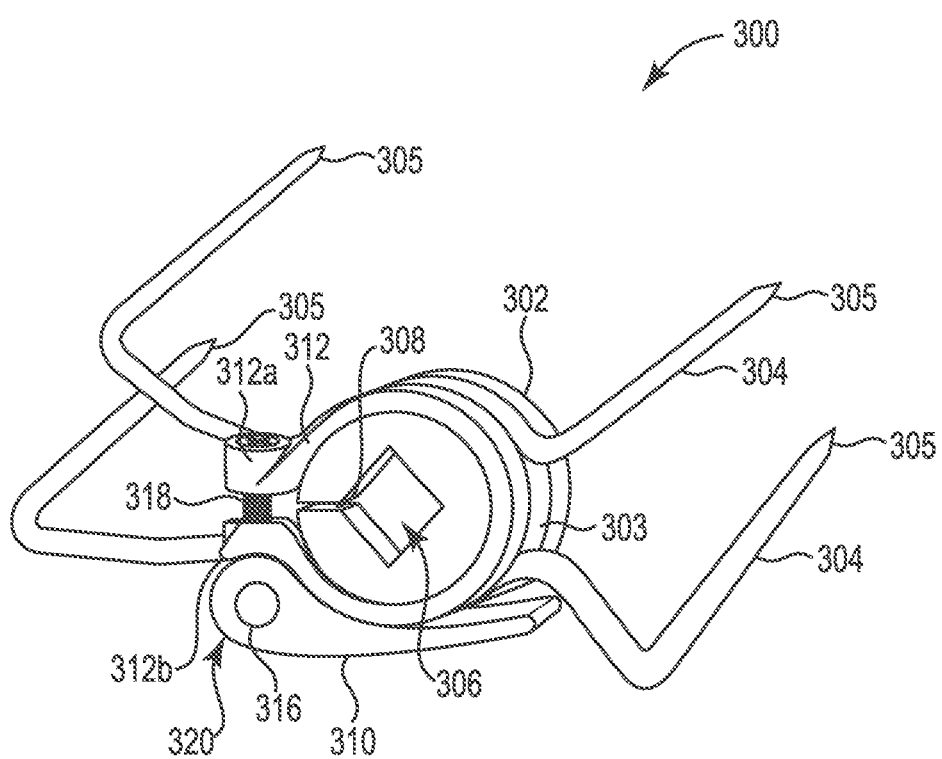
FIG. 3 is a perspective view of an embodiment of a rotisserie fork and clamp of the present disclosure.

FIG. 3 shows a rotisserie fork 300 in accordance with the present disclosure. Fork 300 includes split shaft collar 302 whose outer surface includes a groove 303 within which reside bent wire forks 304 having sharpened ends 305. Collar 302 includes a central aperture 306 which in this instance is a square opening shaped and sized to fit over a conventional 5/16 in (7 mm) diameter square spit rod like rod 104. As will be understood by persons having ordinary skill in the grilling art, other aperture shapes, aperture sizes and corresponding spit shapes and sizes may be used if desired. Split portion 308 in collar 302 is compressible. This enables the inside diameter of aperture 306 to be reduced by closing lever 310 to tighten clamp band 312. When lever 310 is open, the inside diameter of aperture 306 is sufficient to enable free sliding movement of collar 302 and forks 304 along the central axis of the chosen spit rod. When lever 310 is closed, ends 312a and 312b of clamp band 312 are drawn together, split portion 308 is compressed, the inside diameter of aperture 306 is reduced, and collar 302 and forks 304 become immobilized on the spit rod and prevented from further movement during rotisserie grilling. In some embodiments, the disclosed collar has more than one split portion 308. In some embodiments, the width of split portion 308 is reduced to zero when lever 310 is closed, and in other embodiments the width of split portion 308 is reduced but not to zero. The clamping action of lever 310 arises when lever 310 rotates around pivot shaft 316 which in turn is fastened to pull rod 318. Preferably, closing lever 310 will reduce the inner circumference of opening 306. In some embodiments, when lever 310 is closed then collar 302 contacts the spit rod on all sides of the spit rod, and the clearance between collar 306 and the spit rod is reduced to zero on all sides of the spit rod. Changing radius portion 320 on lever 310 retracts pull rod 318 and urges ends 312a and 312b towards one another when lever 310 is rotated from an open to a closed position. In some embodiments, pull rod 318 has a fixed length and the force exerted by clamp band 312 as well as the inside diameter of aperture 306 when lever 310 is closed are predetermined by the dimensions of these and other components of the disclosed device. In some embodiments pull rod 318 has an adjustable length (for example, by providing adjustable threaded engagement of rod 318 into shaft 316, or by adding a suitable adjustment nut that bears on end 312a at the other end of rod 318) so that the degree of final closing force exerted by clamp band 312 and the inside diameter of aperture 306 when lever 310 is closed may be adjusted by a cook or other user. In some embodiments, the changing radius portion 320 is configured to have an increasing and then slightly decreasing radius during the travel of lever 310 from an open to closed position so that near the very end of its closing travel, lever 310 will require slightly reduced closing force and will urge itself into a fully closed position. As will be appreciated by persons having ordinary skill in the grilling art, one or more pairs of the disclosed forks would be used in a rotisserie device. As also will be appreciated by such persons, one or more baskets may be equipped with the disclosed split shaft collar and lever-action quick-release clamp and used in place of the disclosed forks. Compared to conventional rotisserie fork and basket retaining devices, the disclosed split shaft collar and lever-action quick-release clamp provide improved positioning and immobilization of adjustable rotisserie forks and baskets and the foods they skewer or contain during rotisserie grilling.

Figure 4:
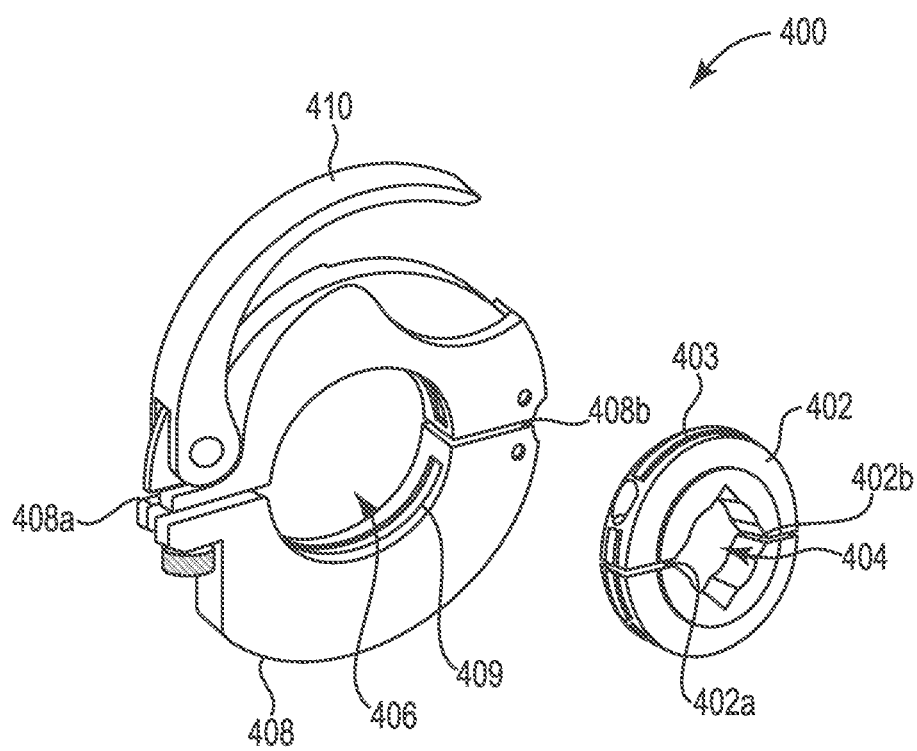
FIG. 4 and FIG. 5 are perspective views of additional clamps for use in rotisserie forks or baskets of the present disclosure.

FIG. 4 shows another rotisserie clamp 400 in accordance with the present disclosure. Split shaft collar 402 includes split portions 402a and 402b, raised circumferential rib 403 and an aperture 404 shaped and sized to fit a desired spit rod. Collar 402 has an outside diameter sized to fit inside circular aperture 406 in split clamp 408 when lever 410 is open. Grooved recess 409 inside aperture 406 receives rib 403 and prevents clamp 408 from slipping off collar 402 when lever 410 is open. As will be understood by persons having ordinary skill in the grilling art, rib 403 and grooved recess 409 may respectively be replaced by a recessed groove in collar 402 and a rib in clamp 408, or by other comparable mechanisms, for example, grooves in both collar 402 and clamp 408, and a split lockring captured in the grooves) that will prevent such slippage. When lever 410 is closed, split portions 408a, 408b, 402a and 402b are compressed, locking together clamp 408 and collar 402 and firmly gripping a spit rod inside collar 402. In some embodiments, rotisserie forks or a basket (for clarity, not shown in FIG. 4) may be fastened to collar 402 so that split collar 408 and lever 410 may be rotated to a convenient position with respect to the forks or basket and nearby food (e.g., a position that offers ample clearance for opening and closing lever 410). In some embodiments, a pair of opposing rotisserie forks may each be fastened to a split collar 408 so that the forks may be individually rotated to a convenient position with respect to one another and nearby food (e.g., positions that enable the forks to be inserted into bone-free, sufficiently dense or otherwise appropriate skewering locations).

Figure 5:
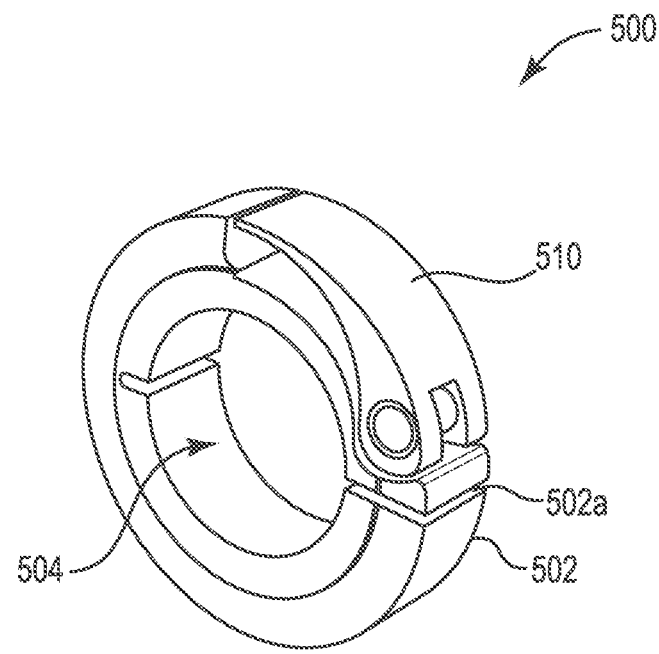

FIG. 5 shows another rotisserie clamp 500 in accordance with the present disclosure. Split shaft collar 502 includes split portion 502a and aperture 504. As depicted, aperture 504 is circular and thus is intended to fit on a circular spit rod. As will be appreciated by persons having ordinary skill in the grilling art, other aperture shapes and spit rod shapes may be employed. The clamping force provided when lever 510 is closed desirably is sufficient to firmly lock split collar 502 on the spit rod even when the rod has a circular shape.

The disclosed split shaft collar and lever-action quick-release clamp may be made from a variety of heat-resistant materials including metals including aluminum, stainless steel, plated steel, and other materials that will be familiar to persons having ordinary skill in the grilling art. Anodized aluminum having a dishwasher-resistant finish represents an especially desirable material for the lever or collar, and plated steel is an especially desirably material for the clamp or collar. The lever, collar and clamp may be formed using casting, machining, forging and other methods that will be familiar to persons having ordinary skill in the grilling art.

The collar and clamp may be used in a variety grills including those shown in U.S. Pat. No. 3,276,440 (Sazegar) and U.S. Pat. No. 3,809,058 (Becker), in U.S. Published Patent Application Nos. US 2009/0308373 A1 (Scott et al.), US 2010/0095946A1 (Creel), US 2010/0258105 A1 (Simms, II) and US 2010/0258106 A1 (Simms, II); hinged covered grills from suppliers including Kamado Joe, Big Green Egg, Bayou Classic, Big Steel Keg, Blaze, California Kamado, Char-Broil, Char-Griller, GourmetPot, Grill Dome, Imperial Kamado, Kamado Joe, Komodo Kamado, Meteor, Monolith Grill GmbH, Primo Grills and Smokers, Saffire, SnS Grills and Weber-Stephen Products; and unhinged covered metal kettle charcoal grills from Weber-Stephen Products, Char-Broil and many other suppliers.

Having thus described preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

The invention claimed is:

1. Rotisserie forks for use on a motorized elongated spit rod having a central axis and a sharpened tip, wherein the forks comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork does not move along the spit rod central axis during rotisserie grilling, wherein the lever moves between its open and closed positions in a direction perpendicular to the spit rod central axis and thus does not lengthen the forks along the spit rod central axis when moved between the open and closed positions, and wherein the fork is free to rotate with respect to the shaft collar when the quick-release lever is open, thus permitting rotation of the fork with respect to the spit rod when such rotation is desired in order to avoid bones or to skewer irregularly-shaped food, and is rotatably fixed with respect to the shaft collar when the lever is closed.

2. A rotisserie device comprising an elongated spit rod and at least one rotisserie fork according to claim 1, wherein the shaft collar has a polygonal opening with the same shape as a cross-section of the spit rod.

3. A rotisserie device comprising an elongated spit rod and at least one rotisserie fork according to claim 1, wherein the shaft collar has a square opening with the same shape as a cross-section of the spit rod.

4. A rotisserie device comprising an elongated spit rod and at least one rotisserie fork according to claim 1, and further comprising at least one second rotisserie fork comprising a) a second split shaft collar having an opening that slidably receives the spit rod and has an inside diameter, and b) a second lever-action quick-release clamp that surrounds the second split shaft collar, has open and closed lever positions, and which when open enables the second split shaft collar and second fork to move along the spit rod central axis, and which when closed reduces the second split shaft collar inside diameter so that the second fork does not move along the spit rod central axis during rotisserie grilling, wherein the second lever-action quick-release clamp is rotatably fixed with respect to the second split shaft collar whether the second quick-release lever is open or closed.

5. A rotisserie device comprising an elongated spit rod and at least one rotisserie fork according to claim 1, wherein the quick-release lever has a length of at least 40 mm.

6. A rotisserie device comprising an elongated spit rod and at least one rotisserie fork according to claim 1, wherein the quick-release lever has a length of at least 45 mm.

7. Rotisserie forks according to claim 1, wherein the quick-release lever has a length of at least 50 mm.

8. Rotisserie forks according to claim 1, wherein the quick-release lever has a length of at least 60 mm.

9. Rotisserie forks according to claim 1, wherein the quick-release lever has a length of at least 70 mm.

10. Rotisserie forks according to claim 1, wherein the split shaft collar and lever-action quick-release clamp assist in positioning food and the forks along the length of a spit rod and reduce the need for as well as the time and manual effort required to adjust or otherwise alter such positioning during rotisserie grilling, when compared to a fork affixed to the spit rod using a thumbscrew.

11. Rotisserie forks according to claim 1, wherein the split shaft collar and lever-action quick-release clamp reduce or eliminate loosening or other fork movement with respect to the spit rod during rotisserie grilling, when compared to a fork affixed to the spit rod using a thumbscrew.

12. A rotisserie device comprising an elongated spit rod and at least two rotisserie forks according to claim 1.

13. A rotisserie device comprising an elongated spit rod and at least four rotisserie forks according to claim 1.

14. Rotisserie forks according to claim 1, wherein the quick-release lever or collar is made from aluminum.

15. Rotisserie forks according to claim 1, wherein the clamp or collar is made from steel.

16. A rotisserie device for use in a ceramic or metal charcoal, gas or pellet grill, the device having at least one motor mounted outside the grill, a removable, rotatable elongated spit rod having a central axis and a sharpened tip and which is rotatably driven by the motor, and at least one rotisserie fork according to claim 1.

17. A rotisserie device according to claim 16, the device further comprising the ceramic or metal charcoal, gas or pellet grill, the grill having at least one motor mounted outside the grill.

18. A rotisserie device according to claim 17, wherein the grill is a hinged covered ceramic kamado grill.

19. A rotisserie device according to claim 17, wherein the grill is a hinged covered metal kamado grill.

20. A rotisserie device according to claim 17, wherein the grill is an unhinged covered metal kettle charcoal grill.

21. Rotisserie forks or a basket for use on a motorized elongated spit rod having a central axis and a sharpened tip, wherein the forks or basket comprise a) a split shaft collar having an opening that slidably receives the spit rod and has an inside diameter, and b) a lever-action quick-release clamp that surrounds the shaft collar, has open and closed lever positions, and which when open enables the shaft collar and fork or basket to move along the spit rod central axis, and which when closed reduces the shaft collar inside diameter so that the fork or basket does not move along the spit rod central axis during rotisserie grilling, wherein the lever moves between its open and closed positions in a direction perpendicular to the spit rod central axis and thus does not lengthen the forks or basket along the spit rod central axis when moved between the open and closed positions, and wherein the lever-action quick-release clamp is free to rotate with respect to the shaft collar when the quick-release lever is open, thus permitting rotation of the lever with respect to the fork, basket or nearby food to a location that will enable more convenient lever opening and closing, and is rotatably fixed with respect to the shaft collar when the lever is closed.

22. Rotisserie forks or a basket according to claim 21, and comprising a basket.

* * * * *